(12) United States Patent
Claerbout et al.

(10) Patent No.: US 10,875,267 B2
(45) Date of Patent: Dec. 29, 2020

(54) METHODS OF MAKING A FILM OF DYNAMICALLY VULCANIZED THERMOPLASTIC ELASTOMERIC MATERIALS

(71) Applicant: ExxonMobil Chemical Patents Inc., Baytown, TX (US)

(72) Inventors: Anna C. Claerbout, Flanders (BE); Peter W. Manders, Hudson, OH (US); Stefan B. Ohlsson, Keerbergen (BE); Willy J. J. Leysen, Sao Paulo (BR)

(73) Assignee: ExxonMobil Chemical Patents Inc., Baytown, TX (US)

( * ) Notice: Subject to any disclaimer, the term of this patent is extended or adjusted under 35 U.S.C. 154(b) by 218 days.

(21) Appl. No.: 15/960,672

(22) Filed: Apr. 24, 2018

(65) Prior Publication Data
US 2018/0354210 A1 Dec. 13, 2018

Related U.S. Application Data

(60) Provisional application No. 62/516,899, filed on Jun. 8, 2017.

(51) Int. Cl.
*B29C 49/04* (2006.01)
*B29D 7/01* (2006.01)
(Continued)

(52) U.S. Cl.
CPC .......... *B29D 7/01* (2013.01); *B29C 48/0018* (2019.02); *B29C 48/0019* (2019.02); *B29C 48/10* (2019.02); *B29C 49/0015* (2013.01); *B29C 49/0042* (2013.01); *B29C 49/04* (2013.01); *B29C 49/64* (2013.01); *B29C 55/023* (2013.01); *B29C 55/28* (2013.01); *B29D 30/0681* (2013.01); *B29C 48/025* (2019.02); *B29C 48/28* (2019.02); *B29C 48/91* (2019.02); *B29C 48/911* (2019.02); *B29C 48/914* (2019.02); *B29C 55/165* (2013.01); *B29C 2049/044* (2013.01); *B29D 2030/0682* (2013.01); *B29K 2021/003* (2013.01); *B29K 2101/12* (2013.01);
(Continued)

(58) Field of Classification Search
None
See application file for complete search history.

(56) References Cited

U.S. PATENT DOCUMENTS 4,462,953 A * 7/1984 Feil .......................... C08J 5/18
264/564
5,252,385 A * 10/1993 Kagawa ................. B29C 55/28
428/220

(Continued)

FOREIGN PATENT DOCUMENTS

| EP | 3 017 925 A | 5/2016 |
|---|---|---|
| JP | 4943712 A | 4/1974 |
| JP | 2010241141 A | 10/2010 |

*Primary Examiner* — Monica A Huson

(57) ABSTRACT

Methods and systems for making a film made of dynamically vulcanized thermoplastic elastomeric material are provided herein. The subject methods and systems achieve dimensional stability of an elastic film by applying thermal treatment as part of the film making process and enhance the shrinkage of the film by intentionally with stretching the film while hot and freezing the film in the stretch. The systems and methods are useful in controlling shrinkage of DVA post film extrusion.

22 Claims, 7 Drawing Sheets

(51) Int. Cl.
*B29C 49/00* (2006.01)
*B29C 55/02* (2006.01)
*B29C 55/28* (2006.01)
*B29D 30/06* (2006.01)
*B29C 49/64* (2006.01)
*B29C 48/00* (2019.01)
*B29C 48/10* (2019.01)
B29K 105/16 (2006.01)
B29C 55/16 (2006.01)
B29K 101/12 (2006.01)
B29K 105/24 (2006.01)
B29K 105/00 (2006.01)
B29C 48/025 (2019.01)
B29C 48/28 (2019.01)
B29K 21/00 (2006.01)
B29C 48/91 (2019.01)
B29C 48/88 (2019.01)
B29K 105/02 (2006.01)

(52) U.S. Cl.
CPC ...... *B29K 2105/02* (2013.01); *B29K 2105/16* (2013.01); *B29K 2105/24* (2013.01); *B29K 2105/258* (2013.01)

(56) References Cited

U.S. PATENT DOCUMENTS

| | | | |
|---|---|---|---|
| 9,586,355 B2 * | 3/2017 | Cheng | ............... B60C 1/0008 |
| 2009/0312458 A1 | 12/2009 | Stevenson et al. | |
| 2016/0311259 A1 | 10/2016 | Shimizu et al. | |

* cited by examiner

US 10,875,267 B2

METHODS OF MAKING A FILM OF DYNAMICALLY VULCANIZED THERMOPLASTIC ELASTOMERIC MATERIALS

CROSS-REFERENCE TO RELATED APPLICATIONS

This application claims priority to U.S. Ser. No. 62/516,899, filed Jun. 8, 2017, herein incorporated by reference.

FIELD OF THE INVENTION

The present disclosure generally relates to methods of making dynamically vulcanized thermoplastic elastomeric films, and more specifically relates to thermal treatment methods and systems for modulating shrinkage and deformation of film made of dynamically vulcanized alloy ("DVA").

BACKGROUND OF THE INVENTION

Dynamically vulcanized alloy ("DVA") blends contain thermoplastic resin and vulcanized elastomer. During preparation of the blend, the elastomer is vulcanized and subsequently converted to a film having a gauge from 10 microns to 300 microns by blown or cast film extrusion processing or casting. The DVA film is highly elastic compared to a nylon film having the same melting point, and has residual orientation in machine direction ("MD") and transverse direction ("TD") obtained by stretching the film during the film process.

DVA blends typically contain thermoplastic resin in an amount ranging from about 10 to 95 weight percent ("wt. %"), preferably 20 to 70 wt. %, based on the weight of the resin(s) and vulcanized elastomer. Elastomers in the DVA blend are vulcanized during preparation of the blend and present in an amount ranging from about 5 to 90 wt. %, preferably from about 30 to 80 wt. %, based on the on the weight of the resin(s) and vulcanized elastomer. However, after extrusion processing, the DVA film will shrink slowly over time (during storage, transportation) as creep in the nylon allows slow elastic recovery of the rubber particles.

Various solutions to reduce shrinkage of the DVA film and maintain film dimensional stability have been offered, but are complicated and/or unsuitable for a commercial film processing line. For example, in one proposed process, the cooling rate around the bubble is adjusted using an air ring design and/or adjusting the air temperature/flow. But under these circumstances, the shrinkage is only partially reduced and does not work effectively especially for film with film thickness lower than 100 microns.

In addition, more specifically, for tire liner films, a proposed solution has been designed to prevent deformation of the DVA film and includes co-winding film into a roll shape together with the liner material. The resulting liner material, however, has a greater width than a width of the film for a tire and does not adhere to itself at the heat treatment temperature. This process (like others) also requires extra equipment in an off-line, hot room.

A need exists, therefore, for methods that can control the shrinkage behavior of a dynamically vulcanized thermoplastic elastomeric film.

SUMMARY OF THE INVENTION

Methods and systems for making a film made of dynamically vulcanized thermoplastic elastomeric material are provided herein. The subject methods and systems control the shrinkage of the film by regulated stretching of the film while hot and coordinated freezing of the film in the stretch. The systems and methods are useful in controlling shrinkage of DVA films after extrusion, in-line or off-line.

In an aspect, the method steps comprise of: (1) providing a dynamically vulcanized thermoplastic elastomeric material melt comprising an elastomer and a thermoplastic resin; (2) introducing the dynamically vulcanized thermoplastic elastomeric material melt into a die having a die diameter; (3) extruding a continuous tubular film bubble from the die; (4) collapsing the tubular film bubble onto a collapsing frame to produce a film; (5) drawing the film onto a plurality of rollers comprising heated rollers and cooling rollers; and (6) relaxing the film to a thickness of between about 10 microns to about 300 microns. The film has a shrinkage factor of one percent or less and can be tubular or a single sheet or double sheets and be used as a pneumatic tire inner liner or in stretch film or in another low permeability film application. As used herein the term "shrinkage factor" refers to the percent that the film shrinks.

The elastomer forms a discontinuous phase of small particles in a continuous phase of thermoplastic resin. The tubular film bubble comprises the dynamically vulcanized thermoplastic elastomeric material and has a bubble diameter. The bubble diameter is a multiple of a blow-up ratio and the die diameter. The tubular film bubble is continuous and can be drawn upwards. The tubular film bubble is drawn onto the collapsing frame with a plurality of nip rollers.

The systems and processes described herein allow film to be stretched in multiple ways and combinations. For example, the film can be stretched by the plurality of rollers in the machine direction but not the transverse direction. Alternatively, the film can be stretched in both a transverse direction and a machine direction by the set of heated rollers. Alternatively, the film can be stretched by the plurality of rollers in the transverse direction, but not the machine direction. The film can be frozen while stretched. The film is cooled as the film is drawn by the plurality of rollers. The temperature of each of the heated rollers is between about 6° C. to 150° C. The temperature of each of the cooling rollers is between about 0° C. to 25° C.

In the present methods and apparatus, the plurality of rollers can be positioned upstream of winding equipment. Alternatively, the plurality of rollers can be used off-line. The die can be annular, or a spider or spiral die.

The methods described herein can further comprise the step of melting a plurality of DVA pellets to produce the dynamically vulcanized thermoplastic elastomeric material melt. The methods can also comprise the steps of cooling the continuous tubular film bubble drawn upward and crystallizing the film to a frost line. Moreover, the methods can comprise the steps of spooling/rolling and/or cutting the film.

In another aspect, methods of making a film comprise the steps of: (1) forming a thermoplastic elastomeric material melt comprising an elastomer and a thermoplastic resin such that the thermoplastic elastomeric material is dynamically vulcanized; (2) extruding the thermoplastic elastomeric material melt through a die having a diameter to form a tubular film bubble; (3) collapsing the tubular film bubble onto a collapsing frame to produce a thermoplastic elastomeric film; and (4) drawing the film onto a plurality of stationery plates to produce a film having a thickness between about 10 microns to about 300 microns and having a shrinkage factor equal to or less than one percent. The plurality of stationery plates comprises a plurality of heated plates and a plurality of cooling plates. The temperature of the heated plates is between about 70° C. to 300° C. The temperature of the cooling plates is between about 0° C. to 15° C.

In yet another aspect, a thermal treatment system is provided. The thermal treatment system comprises a plurality of heated rollers, and a plurality of cooling rollers configured to draw film of thermoplastic elastomeric material. The temperature of each heated roller is between about 70° C. to 300° C. The temperature of each cooling roller is between about 0° C. to 15° C. The film is drawn from a collapsing frame or nip rolls onto the plurality of heated rollers positioned upstream of a winding process, or off-line, to produce the film having a thickness of between about 10 microns to 300 microns, and a shrinkage factor of one percent or less. In the thermal treatment system described herein, the thermoplastic elastomeric material dynamically vulcanized comprises an elastomer and a thermoplastic resin, where the elastomer forms a discontinuous phase of small particles in a continuous phase of thermoplastic resin

DESCRIPTION OF THE PREFERRED EMBODIMENTS

Figure 1:
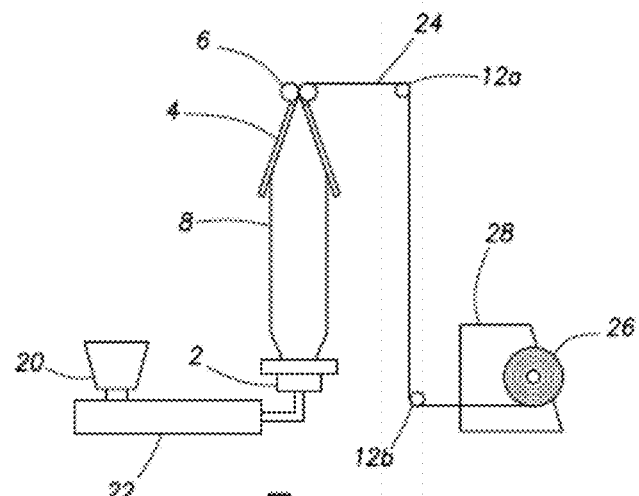
FIG. 1 depicts an extrusion process for producing DVA film.

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, the term "polymer" can refer to homopolymers, copolymers, interpolymers, terpolymers, and the like. Likewise, a copolymer refers to a polymer comprising at least two monomers. When a polymer is referred to as comprising a monomer, the monomer is present in the polymer in the polymerized form of the monomer or in the polymerized form of a derivative from the monomer (i.e., a monomeric unit). However, for ease of reference, the phrase comprising the (respective) monomer is used as shorthand.

Elastomer refers to any polymer or composition of polymers consistent with the ASTM D1566 definition: "a material that is capable of recovering from large deformations, and can be, or already is, modified to a state in which it is essentially insoluble, if vulcanized, (but can swell) in a solvent." Elastomers may be referred to as polymers, elastomeric polymers, or rubbers. The term elastomer may be used interchangeably with the term rubber or polymer.

The terms "vulcanized" or "cured" refers to the chemical reaction that forms bonds or cross-links between the polymer chains of an elastomer.

The term "dynamic vulcanization" is used herein to connote a vulcanization process in which a vulcanizable elastomer, present with a thermoplastic resin, is vulcanized under conditions of high shear. As a result of the shear mixing, the vulcanizable elastomer is simultaneously cross-linked and dispersed as fine particles of a "micro gel" within the thermoplastic resin, creating a dynamically vulcanized alloy ("DVA"). The unique characteristic of the DVA is that, notwithstanding the fact that the elastomer component may be fully cured, the DVA can be processed and reprocessed by conventional rubber processing techniques such as extrusion, injection molding, compression molding, etc. Scrap or flashing can be salvaged and reprocessed.

The terms "downstream" and "upstream" when discussing a process or an extruder are given conventional terms in the art. When referencing something as 'downstream' in the process or extruder, it means a point in time or location in the process or extruder that is after the referenced point. When referencing something as 'upstream' in the process or extruder, it means a point in time or location in the process or extruder that is before the referenced point. For example, if B is introduced downstream of A, then B is introduced into the process or extruder after A and conversely if B is introduced upstream of A, then it is introduced before A.

The term "phr" is parts per hundred rubber or "parts", and is a measure common in the art wherein components of a composition are measured relative to a total of all of the elastomer components. The total phr or parts for all rubber components, whether one, two, three, or more different rubber components is present in a given recipe is normally defined as 100 phr. All other non-rubber components are a ratio against the 100 parts of rubber and are expressed in phr. This way one can easily compare, for example, the levels of curatives or filler loadings, etc., between different compositions based on the same relative proportion of rubber without the need to recalculate percentages for every component after adjusting levels of only one, or more, component(s).

Provided herein are thermal treatment systems and methods to control the shrinkage behavior of a film post film extrusion. Various applications for the film can demand both a low shrinkage factor post extrusion, such as a pneumatic tire inner liner, but include a high shrinkage factor post extrusion such as a stretch film. For the tire inner liner, high dimensional precision (very low shrinkage factor) is important because high shrinkage causes difficulty in inserting the tubular film in a tire molding drum, which further causes the presence of wrinkles and folds in the film during the tire building process.

Thermal treatment systems as described herein can be installed as upstream winding equipment or as an off-line processing step. The present thermal treatment systems include rollers which can be temperature, speed and/or tension controlled. The rollers control the shrinkage factor of the film by relaxing (release stresses in) the film by heating up the film and while hot via temperatures in excess of the dynamically vulcanized thermoplastic material melt, and freezing the film while stretched. Film produced using the methods described herein can be tubular, single sheet or double sheets.

Different combinations of relaxation of dimension and force in the machine direction and/or the transverse direction can be applied in the present methods and systems. For example, the film produced can be constrained to a specific dimension and retracting forces allowed to relax. Alternatively, forces are not constrained and dimensions allowed to relax. Conditions between partial relaxation of dimension and/or force, and combinations of relaxation of dimension and force in MD and TD can be used in the present methods. In other words, the present methodologies work for full or partial relaxation of force and dimension in both MD and TD. In addition, relaxation can occur while the film is in contact with rollers, and relaxation also can occur while the film is not in contact with rollers (i.e. between rollers, which may involve putting the system in a hot box or heating the sections of film between rolls). The film can be free or not free to slide in at least part of the contact area (which can be influenced by the surface treatment or finish of the rolls). Combinations of stretch and relaxation between rollers can also be used in the present methodologies, since there may be reasons to apply some stretch to the film, either before or after a relaxation. In short, a plurality of rollers is used to control the shrinkage of the film by intentionally reducing stresses by heating, and beyond what can be done in the melt and both in MD and TD, and to enhance the shrinkage of the film while freezing the film in the stretch.

Various types of thermoplastic elastomer compositions containing elastomers, both cured and uncured, and thermoplastic resins, are known in the industry as either thermoplastic plastic vulcanizates ("TPVs") or as dynamically vulcanized alloys ("DVAs"). The elastomer is dispersed in the thermoplastic resin, providing flexibility to the material due to the elastomer and the ability to re-process due to the thermoplastic resin. These materials are known to be useful in a variety of applications including automotive parts, such as bumpers, knobs, and trim; electrical applications, such as cable jacketing and connectors; and industrial applications, such as piping, o-rings, sleeves, extruded spiral hoses, and weather stripping. For all of these known applications, the TPVs or DVAs are cast or molded to form the final products.

The fabrication process is often a multiple-step process where the compound is produced by: (i) preparing a rubber master batch by mixing, at temperatures below the cross-linking temperature, the elastomer and curative until a uniform mix state is obtained (this is often referred to as pre-conditioning); and (ii) premixing a resin master batch comprising a thermoplastic resin and plasticizers. If desired, fillers such as carbon, oil, calcium carbonate, nanofillers, etc., may also be added to the rubber master batch. A thermoplastic resin masterbatch can be mixed in a twin-screw extruder by mixing the resin and plasticizers. The resin masterbatch may then be pelletized. The rubber master batch, resin master batch, and all remaining components are then fed into a mixer, as well as any desired secondary components, and mixed under shear conditions. The elastomer component is vulcanized during the melt mixing.

DVAs compounded for low permeability applications are comprised of low-permeability thermoplastic resin, such as polyamide or a blend of polyamides, in which there is dispersed a low-permeability rubber. Such low permeability rubbers include butyl rubber, halobutyl rubbers, or brominated isobutylene para-methylstyrene copolymers. The rubber is cured under conditions of dynamic vulcanization (curing the rubber during melt mixing as opposed to static curing that typically occurs in a rubber mold) and is intimately and uniformly dispersed as a particulate phase within a continuous phase of the thermoplastic resin. For low permeability applications, it is desired to achieve a composition having sub-micron size dispersed rubber particles. This dispersed particle size assists the material in having elastic properties.

The elastic nature is desirable for applications requiring flexibility, strength, and elongation. Such properties are also desirable in tire materials. Thus, in recent years, the use of DVAs as tire inner liner layers has been explored. The thermoplastic resin provides a very low permeability to the inner liner layer while the elastomer provides flexibility and durability to the inner liner layer. Thermoplastic resin provides a very low permeability in comparison to an all-elastomeric inner liner composition. A tire inner liner layer that can be formed from DVA can be formed as a very thin layer. Conventional inner liner layers, comprised of only a base elastomer(s), typically have a thickness or gauge in the range of 1.25 to 7.0 mm while inner liner layers formed from DVA have typically a thickness range of 0.08 mm to 0.25 mm.

The DVA blend contains thermoplastic resin present in an amount ranging from about 10 to 95 wt. %, preferably 20 to 70 wt. %, based on the weight of the resin(s) and vulcanized elastomer. The elastomer in these blends are vulcanized during preparation of the blend. The elastomer is present in an amount ranging from about 5 to 90 wt. %, preferably from about 30 to 80 wt. %, based on the weight of the resin(s) and vulcanized elastomer.

The DVA has a desired morphology wherein the elastomer is uniformly dispersed as fine particles within the thermoplastic resin. The thermoplastic resin component forms the continuous phase and the elastomer is the dispersed phase even where the rubber to resin ratio is 1.0 or more. The dispersed particle size of the elastomer and the structure of the resin phase can be controlled to improve the durability of the DVA, in particular durability at low temperatures.

The elastomeric component of the DVA may be selected from an assortment of thermosetting, elastomeric materials. For uses where impermeability of the final article to be produced is desired, the use of at least one low-permeability elastomer is desired.

Elastomers may be derived from a mixture of monomers, the mixture having at least the following monomers: a $C_4$ to $C_7$ isoolefin monomer and a polymerizable monomer. In such mixtures, the isoolefin is present in a range from 70 to 99.5 wt. % of the total monomers, or 85 to 99.5 wt. %. The polymerizable monomer is present in amounts in the range of from 0.5 to about 30 wt. %, or from 0.5 to 15 wt. %, or from 0.5 to 8 wt. %. The elastomer will contain monomer derived unit amounts having the same weight percentages.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The polymerizable monomer may be a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene, alkylstyrene e.g., p-methylstyrene, and dichlorostyrene are also suitable for preparing a useful elastomer.

Elastomers that may be useful include isobutylene-based copolymers. An isobutylene based elastomer or a polymer refers to an elastomer or a polymer comprising at least 70 mole percent ("mol %") repeat units from isobutylene and at least one other polymerizable unit. The isobutylene-based copolymer may or may not be halogenated.

The elastomer may be a butyl-type rubber or branched butyl-type rubber, especially halogenated versions of these elastomers. Useful elastomers are unsaturated butyl rubbers such copolymers of olefins or isoolefins and multiolefins. Non-limiting examples of unsaturated elastomers are poly(isobutylene-co-isoprene), polyisoprene, polybutadiene, polyisobutylene, poly(styrene-co-butadiene), natural rubber, star-branched butyl rubber, and mixtures thereof. Useful elastomers can be made by any suitable means known in the art. Butyl rubber is obtained by reacting isobutylene with 0.5 to 8 wt. % isoprene, or reacting isobutylene with 0.5 wt. % to 5.0 wt. % isoprene, the remaining weight percent of the polymer being derived from isobutylene; the butyl rubber contains monomer derived unit amounts having the same weight percentages.

Elastomeric compositions may also comprise at least one random copolymer comprising a $C_4$ to $C_7$ isoolefin and an alkylstyrene comonomer. The isoolefin may be selected from any of the above listed $C_4$ to $C_7$ isoolefin monomers, and is preferably an isomonoolefin, and may be isobutylene. The alkylstyrene may be para-methylstyrene, containing at least 80%, alternatively at least 90% wt. % of the para-isomer. The random copolymer may optionally include functionalized interpolymers. The functionalized interpolymers have at least one or more of the alkyl substituents groups present in the styrene monomer units; the substituent group may be a benzylic halogen or some other functional group. The polymer may be a random elastomeric copolymer of a $C_4$ to $C_7$ α-olefin and an alkylstyrene comonomer. The alkylstyrene comonomer may be para-methylstyrene containing at least 80%, alternatively at least 90% wt. %, of the para-isomer. The random comonomer may optionally include functionalized interpolymers wherein at least one or more of the alkyl substituents groups present in the styrene monomer units contain a halogen or some other functional group; up to 60 mol % of the para-substituted styrene present in the random polymer structure may be functionalized. Alternatively, from 0.1 to 5 mol % or 0.2 to 3 mol % of the para-substituted styrene present may be functionalized.

The functional group may be halogen or some other functional group which may be incorporated by nucleophilic substitution of any benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. The elastomer comprises random polymers of isobutylene and 0.5 to 20 mol % para-methylstyrene wherein up to 60 mol % of the methyl substituent groups present on the benzyl ring is functionalized with a halogen such as bromine or chlorine, an acid, or an ester.

The functionality on the elastomer is selected such that it can react or form polar bonds with functional groups present in the thermoplastic resin, for example, acid, amino or hydroxyl functional groups, when the DVA components are mixed at reactive temperatures.

Brominated poly(isobutylene-co-p-methylstyrene) "BIMSM" polymers may be useful and generally contain from 0.1 to 5 mol % of bromomethylstyrene groups relative to the total amount of monomer derived units in the copolymer. The amount of bromomethyl groups is from 0.5 to 3.0 mol %, or from 0.3 to 2.8 mol %, or from 0.4 to 2.5 mol %, or from 0.5 to 2.0 mol %, wherein a desirable range may be any combination of any upper limit with any lower limit. The BIMSM polymer has either 1.0 to 2.0 mol % bromomethyl groups, or 1.0 to 1.5 mol % of bromomethyl groups.

Expressed another way, exemplary BIMSM polymers that may be useful contain from 0.2 to 10 wt. % of bromine, based on the weight of the polymer, or from 0.4 to 6 wt. % bromine, or from 0.6 to 5.6 wt. %. Useful BIMSM polymers may be substantially free of ring halogen or halogen in the polymer backbone chain. The random polymer is a polymer of $C_4$ to $C_7$ isoolefin derived units (or isomonoolefin), para-methylstyrene derived units and para-(halomethylstyrene) derived units, wherein the para-(halomethylstyrene) units are present in the polymer from 0.5 to 2.0 mol % based on the total number of para-methylstyrene, and wherein the para-methylstyrene derived units are present from 5 to 15 wt. %, or 7 to 12 wt. %, based on the total weight of the polymer. The para-(halomethylstyrene) is para-(bromomethylstyrene).

Other suitable low-permeability elastomers are isobutylene containing elastomers such isobutylene-isoprene-alkylstyrene terpolymers or halogenated isobutylene-isoprene-alkylstyrene terpolymers wherein for each of these terpolymers, the isobutylene derived component in the terpolymer is 70 to 99 wt. % of the monomer units in the polymer, the isoprene derived component is 29 to 0.5 wt. % of the monomer units in the polymer, and the alkylstyrene derived component is 29 to 0.5 wt. % of the monomer units in the polymer.

Suitable $C_4$ to $C_7$ isoolefin derived elastomers (including the brominated isobutylene-paramethylstyrene copolymers) have a number average molecular weight ("Mn") of at least about 25,000, at least about 50,000, at least about 75,000, at least about 100,000, and/or at least about 150,000. The polymers may also have a ratio of weight average molecular weight ("Mw") to Mn, i.e., Mw/Mn of less than about 6, less than about 4, less than about 2.5, and/or less than about 2.0. Suitable halogenated isobutylene elastomer components include copolymers (such as brominated isobutylene-paramethylstyrene copolymers) having a Mooney viscosity (1+4) at 125° C. (as measured by ASTM D 1646-99) of 30 or more, and/or of 40 or more.

Elastomers include copolymers of isobutylene and para-alkylstyrene, which may or may not be halogenated. The copolymer of isobutylene and para-alkylstyrene may be halogenated. Such elastomers are described in European Patent Application 0 344 021. The copolymers may have a substantially homogeneous compositional distribution. Alkyl groups for the para-alkylstyrene moiety include alkyl groups having from 1 to 5 carbon atoms, primary haloalkyl, secondary haloalkyl having from 1 to 5 carbon atoms and mixtures thereof. A copolymer may be comprised isobutylene and para-methylstyrene. Brominated copolymers of isobutylene and para-methylstyrene include those having 5 to 12 wt. % para-methylstyrene, 0.3 to 1.8 mol % brominated para-methylstyrene, and a Mooney viscosity of 30 to 65 (1+4) at 125° C. (as measured by ASTM D 1646-99).

A thermoplastic (alternatively referred to as thermoplastic resin) is a thermoplastic polymer, copolymer, or mixture thereof having a Young's modulus of more than 200 MPa at 23° C. The resin should have a melting temperature of about 160° C. to about 260° C., less than 260° C., and/or than about 240° C. The thermoplastic resin may have a molecular weight in the range of 13,000 to 50,000. By conventional definition, a thermoplastic is a synthetic resin that softens when heat is applied and regains its original properties upon cooling.

Such thermoplastic resins may be used singly or in combination and generally contain nitrogen, oxygen, halogen, sulfur or other groups capable of interacting with aromatic functional groups such as halogen or acidic groups.

Suitable thermoplastic resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK), ethylene copolymer resins (EVA or EVOH) and mixtures thereof.

Suitable polyamides (nylons) comprise crystalline or resinous, high molecular weight solid polymers including homopolymers, copolymers, and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of polyamides include polycaprolactam (nylon-6), polylauryllactam (nylon-12), polyhexamethyleneadipamide (nylon-6,6), polyhexamethyleneazelamide (nylon-6,9), polyhexamethylenesebacamide (nylon-6,10), poly(hexamethylene dodecanediamide (nylon-6,12), polyhexamethyleneisophthalamide (nylon-6, IP) and the condensation product of 11-aminoundecanoic acid (nylon-11). Commercially available polyamides may be used with linear crystalline polyamides having a softening point or melting point between 160° C. and 260° C.

Suitable polyesters which may be employed include the polymer reaction products of one or a mixture of aliphatic or aromatic polycarboxylic acids esters of anhydrides and one or a mixture of diols. Examples of satisfactory polyesters include poly(trans-1,4-cyclohexylene $C_{2-6}$ alkane dicarboxylates such as poly(trans-1,4-cyclohexylene succinate) and poly(trans-1,4-cyclohexylene adipate); poly(cis or trans-1,4-cyclohexanedimethylene)alkanedicarboxylates such as poly(cis-1,4-cyclohexanedimethylene)oxlate and poly-(cis-1,4-cyclohexanedimethylene)succinate, poly($C_{2-4}$ alkylene terephthalates) such as polyethyleneterephthalate and polytetramethylene-terephthalate, poly ($C_{2-4}$ alkylene isophthalates) such as polyethyleneisophthalate and polytetramethylene-isophthalate and like materials. Polyesters may be derived from aromatic dicarboxylic acids such as naphthalenic or phthalic acids and $C_2$ to $C_4$ diols, such as polyethylene terephthalate and polybutylene terephthalate. Polyesters may have a melting point in the range of 160° C. to 260° C.

Poly(phenylene ether) (PPE) resins which may be used are well known, commercially available materials produced by the oxidative coupling polymerization of alkyl substituted phenols. They are generally linear, amorphous polymers having a glass transition temperature in the range of 190° C. to 235° C.

Ethylene copolymer resins include copolymers of ethylene with unsaturated esters of lower carboxylic acids as well as the carboxylic acids per se. In particular, copolymers of ethylene with vinylacetate or alkyl acrylates for example methyl acrylate and ethyl acrylate can be employed. These ethylene copolymers typically comprise about 60 to about 99 wt. % ethylene, preferably about 70 to 95 wt. % ethylene, more preferably about 75 to about 90 wt. % ethylene. The expression "ethylene copolymer resin" as used herein means, generally, copolymers of ethylene with unsaturated esters of lower ($C_1$-$C_4$)monocarboxylic acids and the acids themselves; e.g., acrylic acid, vinyl esters or alkyl acrylates. It is also meant to include both "EVA" and "EVOH", which refer to ethylene-vinylacetate copolymers, and their hydrolyzed counterpart ethylene-vinyl alcohols.

In the dynamically vulcanized alloy ("DVA"), the thermoplastic resin is present in an amount ranging from about 10 to 95 wt. % based on the alloy blend. The thermoplastic resin may be present in an amount ranging from 35 to 90 wt. %. The amount of elastomer in the DVA is in an amount ranging from about 5 to 90 wt. % based on the alloy blend, and from about 5 to 80 wt. % in another embodiment. The elastomer is present in an amount ranging from 10 to 65 wt. %. The thermoplastic resin is present in the alloy, relative to the amount of elastomer, in an amount in the range of 40 to 80 phr.

The DVA may further comprise a secondary elastomer. The secondary elastomer may be any elastomer. The secondary elastomer may be a copolymer comprising maleic anhydride and ester functionalities such as maleic anhydride-modified ethylene-ethyl acrylate. The secondary elastomer may be added to the DVA processing extruder simultaneously with the initial elastomer and the thermoplastic resin initial feedstreams. Alternatively, it may be added to the extruder downstream from the elastomer and initial thermoplastic resin feedstreams. The amount of the secondary elastomer in the DVA may be in the range of from about 2 wt. % to about 45 wt. %. If the DVA comprises at least one elastomer and a secondary elastomer, the total amount of both the elastomer and secondary elastomer is preferably in the range of from about 2 wt. % to about 90 wt. %. This secondary elastomer may be cured along with the primary isoolefin based elastomer or it may be selected to remain uncured and act as a compatibilizer as discussed below.

Other materials may be blended into the DVA to assist with preparation of the DVA or to provide desired physical properties to the DVA. Such additional materials include, but are not limited to, curatives, stabilizers, compatibilizers, reactive plasticizers, non-reactive plasticizers, extenders and polyamide oligomers or low molecular weight polyamide and other lubricants as described in U.S. Pat. No. 8,021,730 B2.

Curing of the primary elastomer is generally accomplished by the incorporation of the curing agents and optionally accelerators, with the overall mixture of any such components referred to as the cure system or cure package. Suitable curing components include sulfur, metal oxides, organometallic compounds, radical initiators. Common curatives include ZnO, CaO, MgO, Al2O3, CrO3, FeO, $Fe_2O_3$, and NiO. These metal oxides can be used alone or in conjunction with metal stearate complexes (e.g., the stearate salts of Zn, Ca, Mg, and Al), or with stearic acid or other organic acids and either a sulfur compound or an alkyl or aryl peroxide compound or diazo free radical initiators. If peroxides are used, peroxide co-agent commonly used in the art may be employed. The use of peroxide curative may be avoided if the thermoplastic resin is one such that the presence of peroxide would cause the thermoplastic resin to cross-link.

As noted, accelerants (also known as accelerators) may be added with the curative to form a cure package. Suitable curative accelerators include amines, guanidines, thioureas, thiazoles, thiurams, sulfenamides, sulfenimides, thiocarbamates, xanthates, and the like. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio)benzothiazole (MBS or MOR), compositions of 90% MOR and 10% MBTS (MOR90), N-tertiarybutyl-2-benzothiazole sulfenamide (TBBS), N-(1,3-dimethylbutyl)-N'-phenyl-p-phenylenediamine (6PPD), and N-oxydiethylene thiocarbamyl-N-oxydiethylene sulfonamide (OTOS), zinc 2-ethyl hexanoate (ZEH), N,N'-diethyl thiourea.

Components useful in making the viscosity between the elastomer and thermoplastic components compatible include low molecular weight polyamides, maleic anhydride grafted polymers having a molecular weight on the order of 10,000 or greater, methacrylate copolymers, tertiary amines and secondary diamines. These compounds may act to increase the 'effective' amount of thermoplastic material in the elastomeric/thermoplastic compound. The amount of additive is selected to achieve the desired viscosity comparison without negatively affecting the characteristics of the DVA. If too much additive is present, impermeability may be decreased and the excess may have to be removed during post-processing. If not enough compatibilizer is present, the elastomer may not invert phases to become the dispersed phase in the thermoplastic resin matrix.

Both reactive and non-reactive plasticizers can function as compatibilizers due to the nature of a plasticizer. Plasticizers for thermoplastics are generally defined as a compound added to polymeric materials to improve flexibility, extensibility, and ability to process. Known and conventional thermoplastic plasticizers are supplied in the form of low to high viscosity liquid and may be functionalized. Many different plasticizers are known in the thermoplastic resin art as plasticizers have different compatibilities with each type of thermoplastic resin and have different effects on the properties of the thermoplastic resin. Known thermoplastic plasticizers include different types of esters, hydrocarbons (aliphatic, naphthenic, and aromatic), polyesters, and polycondensates; see *Handbook of Thermoplastic Elastomers*, Jiri George Drobny, p. 23 (William Andrew Publishing, 2007). For polyamides, known non-reactive plasticizers include hydrocarbons functionalized by tertiary amines, secondary diamines, or sulfonamides. One particularly well known compound is butylbenzylsulfonamide (BBSA).

As described herein, in an aspect, to produce DVA film (also referred to simply as "film" or "dynamically vulcanized thermoplastic elastomeric film"), pelletized DVA material can be fed and melted in a mixer to produce a dynamically vulcanized thermoplastic elastomeric material melt ("melt"). Instead of forming DVA pellets, the melt can be produced from DVA raw materials in a first mixer through a second mixer which avoids re-melting DVA pellets. See generally, U.S. Published Application No. 2015/0065625.

Figure 2:
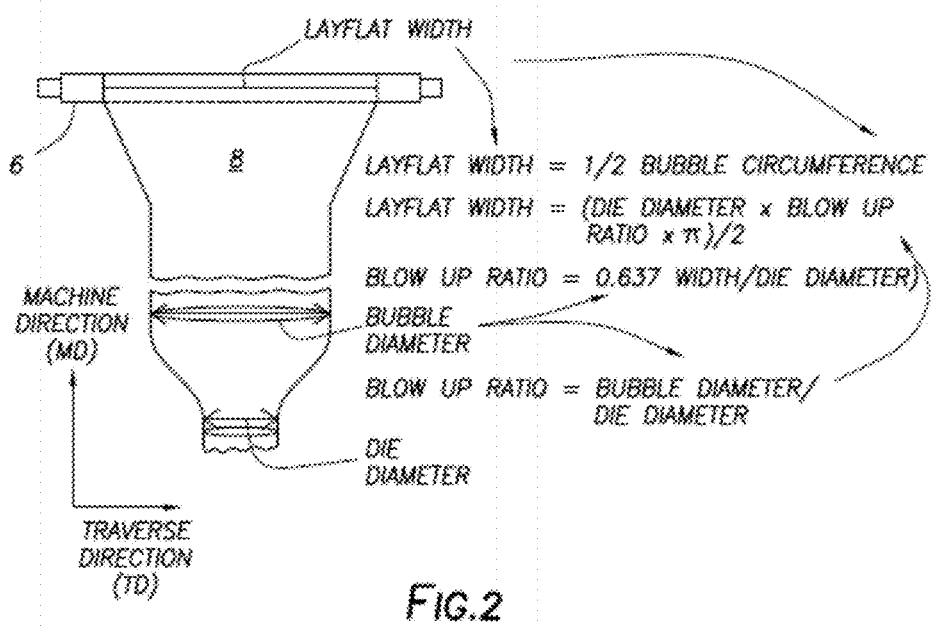
FIG. 2 shows the bubble and bubble size calculations.
Figure 3:
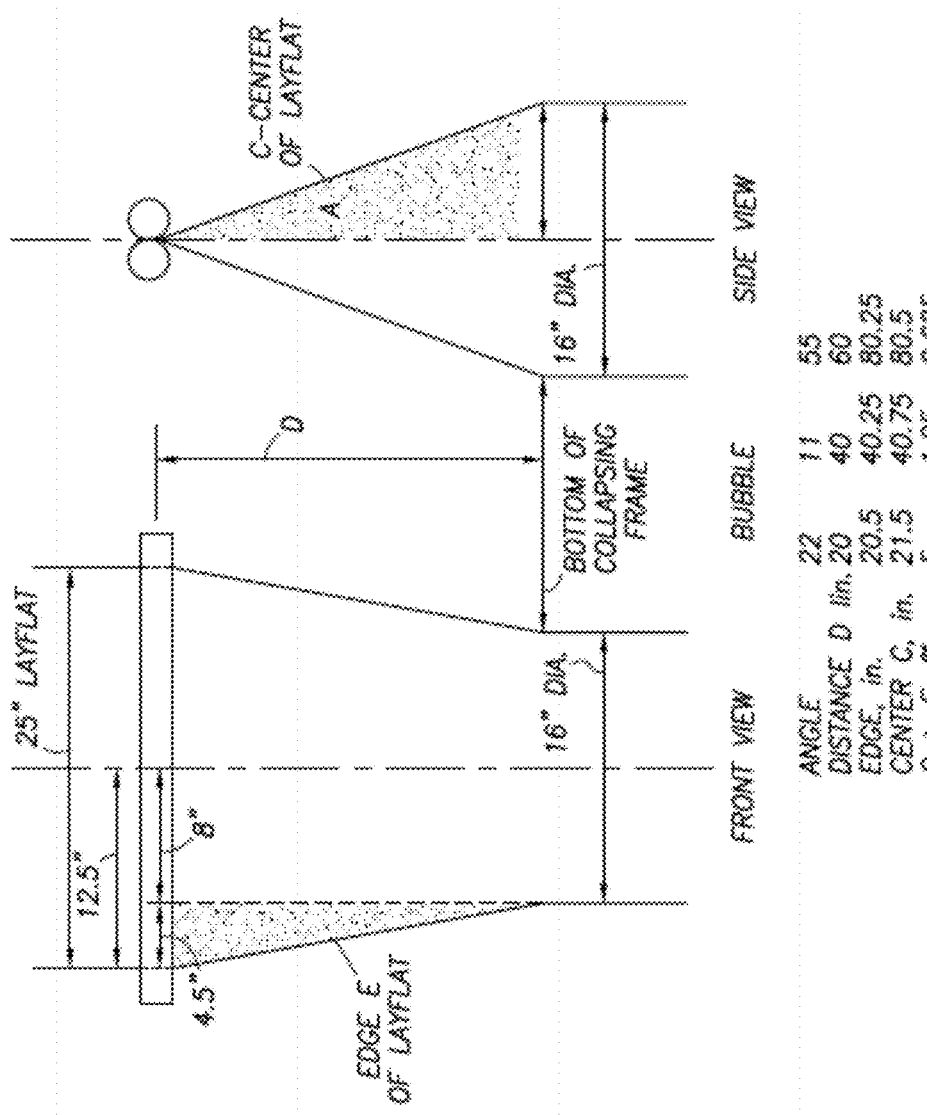
FIG. 3 shows geometry theory of a collapsing bubble.
Figure 4:
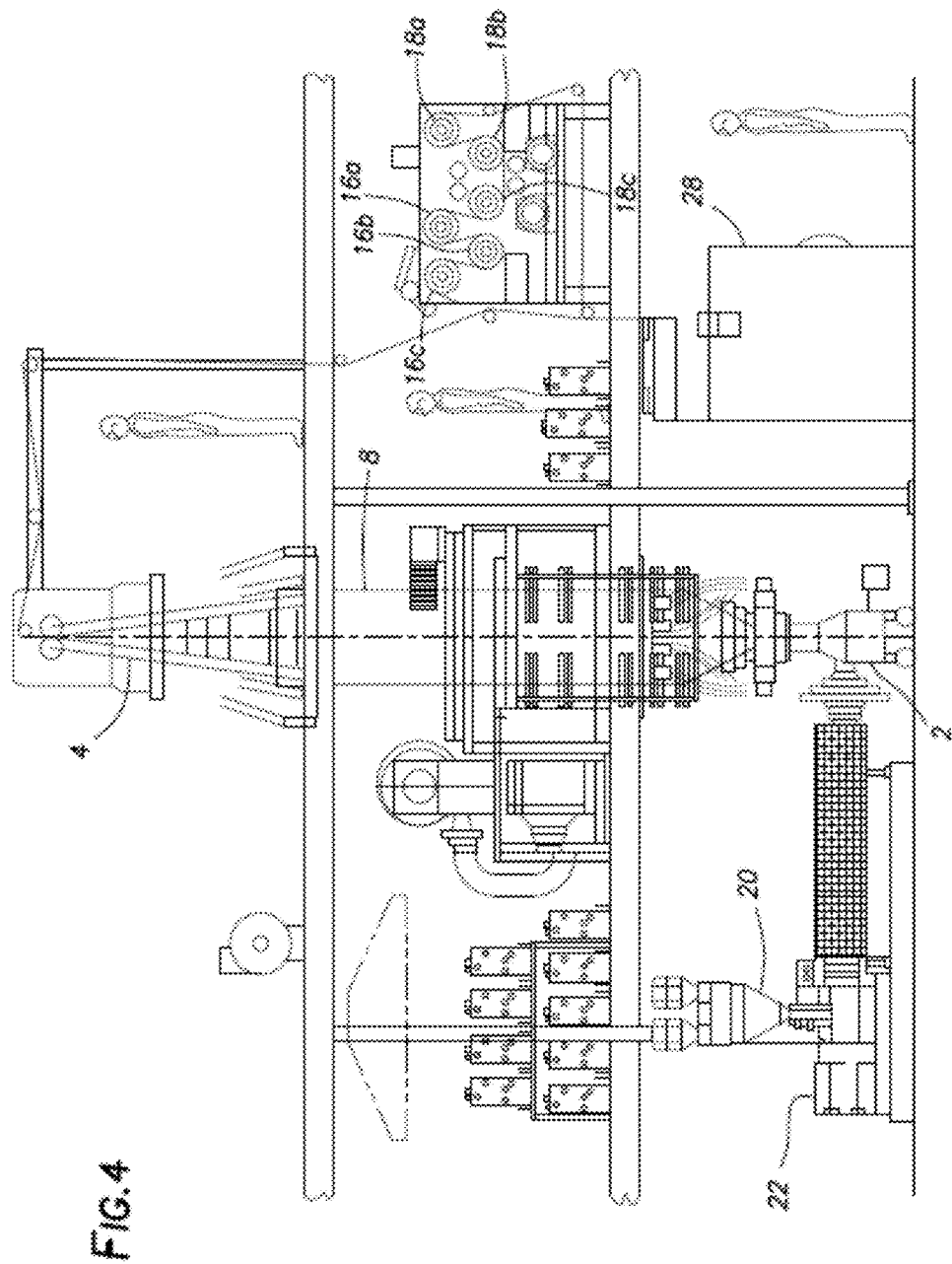
FIG. 4 is a schematic of the present methods and systems.
Figure 5:
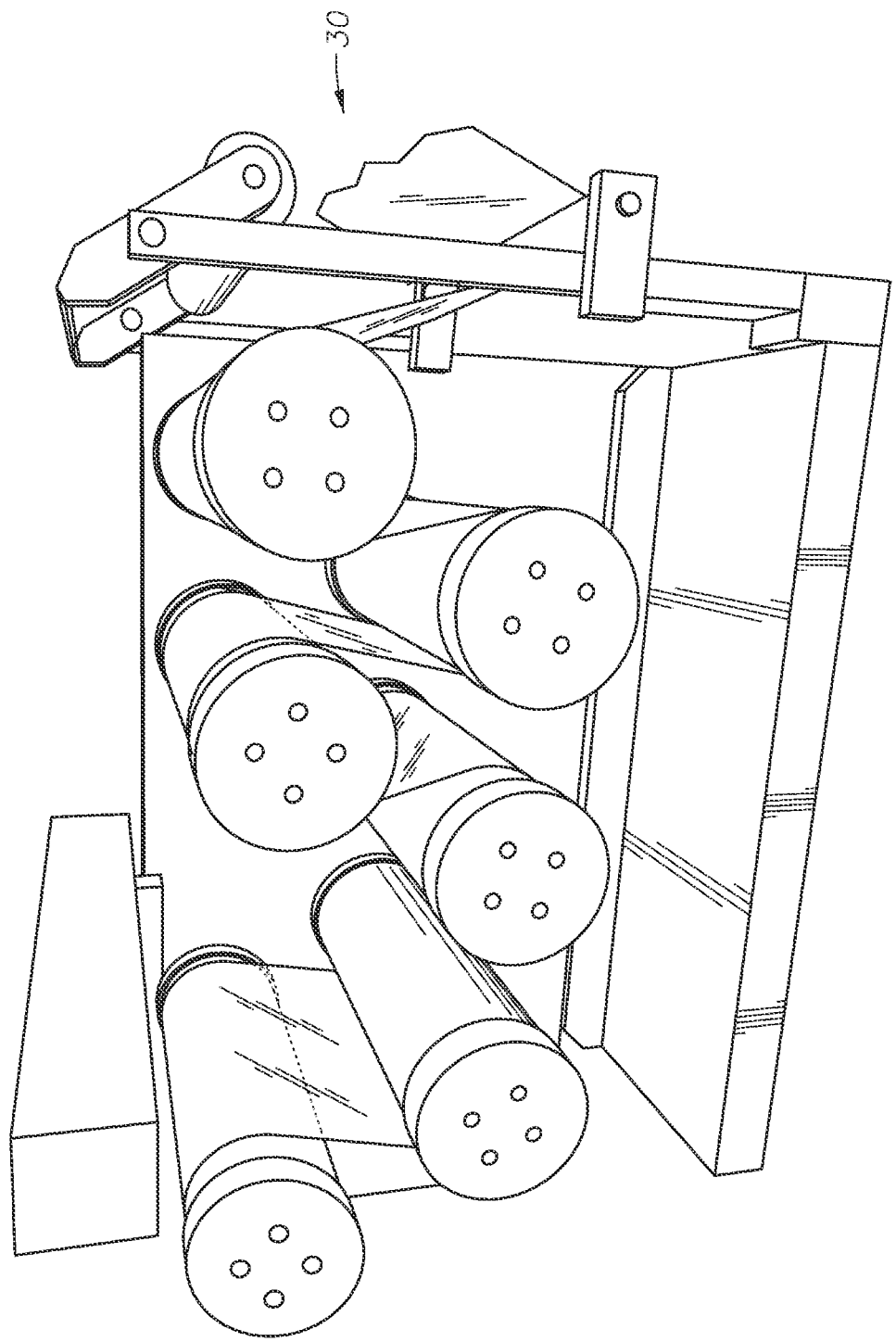
FIG. 5 shows an exemplary thermal treatment system described herein.

As shown in FIGS. 1, 2 and 3, using a blown film process to generate film, DVA pellets (not shown) are dried and transferred to a hopper 20. The DVA pellets are then feed to the extruder 22 and melted to form a dynamically vulcanized thermoplastic elastomeric material melt (herein referred to sometimes as a "melt.") The melt is then forced into an annular, spider or spiral die 2 forming a tubular film bubble 8.

More specifically, the dynamically vulcanized thermoplastic elastomeric material melt can be cooled to between about 100 to 150° C. upon discharging from the die and may form a weak semi-solid tubular film bubble. The diameter of the bubble (herein referred to as the "bubble diameter" 28) is rapidly expanded using air pressure. The tubular film bubble 8 is drawn upwards, stretching the plastic in both the transverse and machine directions. The process of blowing and drawing the bubble creates a thin film.

As the bubble 8 cools, it crystallizes to the frost line. As the bubble 8 continues to cool, it is drawn through the collapsing frame 4 by one or more sets of nip rollers 6. The collapsing frame 4 collapses and flattens the tubular film bubble into lay-flat tubing and to a thickness of between about 10 microns to about 300 microns, which can then be spooled or cut.

After the extrusion process, and upstream of the winding equipment, or off-line, the present thermal treatment system 30 draws the film onto a plurality of rollers 14 having a set of heating rollers 16 and a set of cooling rollers 18, relaxing the film. The thermal treatment system 30 can be used for different film types: tube, single sheet or double sheets. In addition, different methods of treating the film can be applied including constraining the film to a dimension where retractive forces are allowed to relax. Alternatively, the forces are not constrained and the dimension is allowed to relax. The thermal treatment system 30 can control the elastic behavior of the film. The plurality of rollers 14 can reduce stresses in the film. The plurality of rollers 14 can provide full or partial relaxation of the film.

The present thermal treatment systems 30 and methods described herein can be applied to conditions between the extremes (partial relaxation of dimension and/or force), and different combinations of relaxation of dimension and force in the MD and the TD. For example, MD dimension is constrained, whereas a TD dimension is relaxed. The present systems and methods provide for combinations of full or partial relaxation of force and dimension in either one or both directions of MD and TD.

Relaxation of film can occur when the film is in contact with roller. Alternatively, relaxation may not occur when the film is in contact with roller (i.e. relaxation occurs between rollers, which may involve putting the rollers in a hot box or heating the sections of film between rollers). The film can be free or not free to slide in at least part of the contact area (which could be influenced by the surface treatment or finish of the rollers). In other words, various combinations of stretch and relaxation between rolls may be used, since there may be reasons to apply some stretch to the film, either before or after a relaxation. The present systems can also be used to control the shrinkage of the film by intentionally stretching it (both in MD and TD) while hot beyond what can be done in the melt, and freezing in the stretch.

In addition to an increased film dimensional stability, improved barrier properties can be expected by doing a solid state stretch beyond what can be achieved in the melt state when the film is blown. The film is elastic. The film retracts immediately, but largely retains a permanent set or deformation. Simultaneous bi-axial stretch to at least 2 times in MD and TD is possible, with relaxation to about 1.5 times in both directions, i.e. thickness reduced to approximately 0.45 of original and at room temperature. If stretching occurs at elevated temperature, and frozen, greater reduction of thicknesses can be obtained beyond that achieved in the melt.

In the present systems, distances between each of the plurality of rollers in combination with line speed determines the residence time. Separation of the rollers can vary. The roller diameter and wrap angle can vary as well.

| Operating Conditions of the Thermal Treatment Unit | | | |
|---|---|---|---|
| | Minimum | Typical | Max |
| Residence Time | 5 seconds | 20 seconds | 1 minute |
| Temperature setting heating roll(s) | 50° C. | 70° C. | 150° C. |
| Temperature setting cooling roll(s) | 10° C. | 15° C. | 25° C. |

-continued

| Operating Conditions of the Thermal Treatment Unit | | | |
|---|---|---|---|
| | Minimum | Typical | Max |
| Speed of the film entering the thermal treatment unit | 4 m/min | 10 m/min | 20 m/min |

The speed of the rolls can vary between the 0.1× haul-off speed and 10× haul-off speed. Any combination of speed control and tension control can be used, for example, by controlling the differential speed between one roll pair and tension between another roll pair.

In the thermal treatment system 30, the temperature of the film is a function of the contact time and speed or the rollers. The temperature range of the plurality of rollers can vary between 0° C. and 300° C. Heat transfer can be performed using hot gas, oil, water, electrical tracing, radiant heaters, microwave, flame, conduction, convection, contact. For DVA film consisting of Nylon 6 (Tg 47° C.) and Nylon 6.6 (Tg 70° C.), a temperature in range of 50° C. to 80° C. is preferred. Generally, the cooling rollers operate at a temperature between about 10° C. to 15° C. The heating rollers operate at a temperature between about 70° C. to 300° C. At a minimum, there are two heating rollers and two cooling rollers. However, there can be four (4) and/or eight (8) heating rollers and/or four (4) or eight (8) cooling rollers used in the thermal treatment system 30.

Tests were performed on various film samples.

These film samples were produced on film blown line conditions as set out in Table 1 below. The composition of Films A-K tested in Table 1 was the same: (a) 100 phr of Brominated para-methylstyrene-isobutylene copolymer, 5 wt % PMS, 0.75 mol % BrPMS, Mooney viscosity, ML (1+8) 125° C.=45; (b) 56 phr of a polyamide copolymer UBE 5024 (commercially available from UBE Chemical, also known as Nylon 6/66 having a comonomer ratio 80/20, relative viscosity (1% in 96% $H_2SO_4$ at 23° C.)=3.4); (c) 14 phr of a polyamide homopolymer Ultramid B27 (Nylon 6, relative viscosity (1% in 96% $H_2SO_4$ at 23° C.)=2.7); (d) 10 phr of a polyisobutylene succinic anhydride of PIBSA 950 commercially available from Texas Petrochemicals LP having a weight average molecular weight before anhydride reaction=950, viscosity at 100° C.=459 cSt, saponification #=100 mg KOH/gm; (e) 2 phr of zinc oxide; and (f) 0.48 phr of stabilizer package. Film F did not undergo annealing, Film G was annealed at 90° C., Film H was annealed at 60° C., Film I was annealed at 60° C., Film J was annealed at 70° C., and Film K was annealed at 80° C.

TABLE 1

| Film sample ref # | A | B | C | D | E | F | G | H | I | J | K |
|---|---|---|---|---|---|---|---|---|---|---|---|
| Die temperature (° C.) | 240 | 240 | 240 | 240 | 240 | 240 | 240 | 240 | 225 | 235 | 240 |
| Line speed (m/min) | 12.4 | 13.4 | 7 | 7 | 9.6 | 9.5 | 9.7 | 9.5 | 9.7 | 9.7 | 9.7 |
| Specific output (Kg/hr/rpm) | 4.0 | 4.0 | 4.0 | 4.0 | 3.9 | 3.7 | 3.8 | 4.6 | 3.8 | 3.8 | 3.8 |
| Melt Pressure (bar) | 326 | 329 | 324 | 324 | 291 | 379 | 407 | 388 | 407 | 407 | 407 |
| BUR | 3.1 | 3.1 | 2.4 | 2.4 | 2.4 | 2.1 | 2.1 | 2.1 | — | — | — |
| Heating Rollers Temperature (° C.) | — | — | — | 70 | — | — | 90 | 60 | — | — | — |
| Die gap (mm) | 0.75 | 0.75 | 0.75 | 0.75 | 0.75 | 0.75 | 0.75 | 0.75 | 0.75 | 0.75 | 0.75 |
| Die diameter (mm) | 203 | 203 | 203 | 203 | 203 | 203 | 203 | 203 | 203 | 203 | 203 |
| Extruder barrel diameter (mm) Barrier design screw 32L/D Grooved feed section | 88.9 | 88.9 | 88.9 | 88.9 | 88.9 | 88.9 | 88.9 | 88.9 | 88.9 | 88.9 | 88.9 |

Generally, dimensional stability of film can be measured as follows. About one meter long sample film (tube) is taken during production at a blown film line running at 9 m/min. The sample is marked with 4 squares (15×15 cm). The dimensions (length, width) of the square are measured with a digital Capiler (0.01 mm scale), at 4 different positions. To define the film dimensional stability, the dimensions are measured again after minimum of 2 days at room temperature and/or after 1 day in an oven at 60° C. (simulating the worst conditions for sample storage/transportation conditions).

The data shows that the temperature of the heating rollers is a key variable for achieving dimensional stability of the DVA film. Improved dimensional stability can be obtained with heating rollers having temperatures equal to and above 70° C. (100 micron film, line speed 9 m/min).

Figure 6:
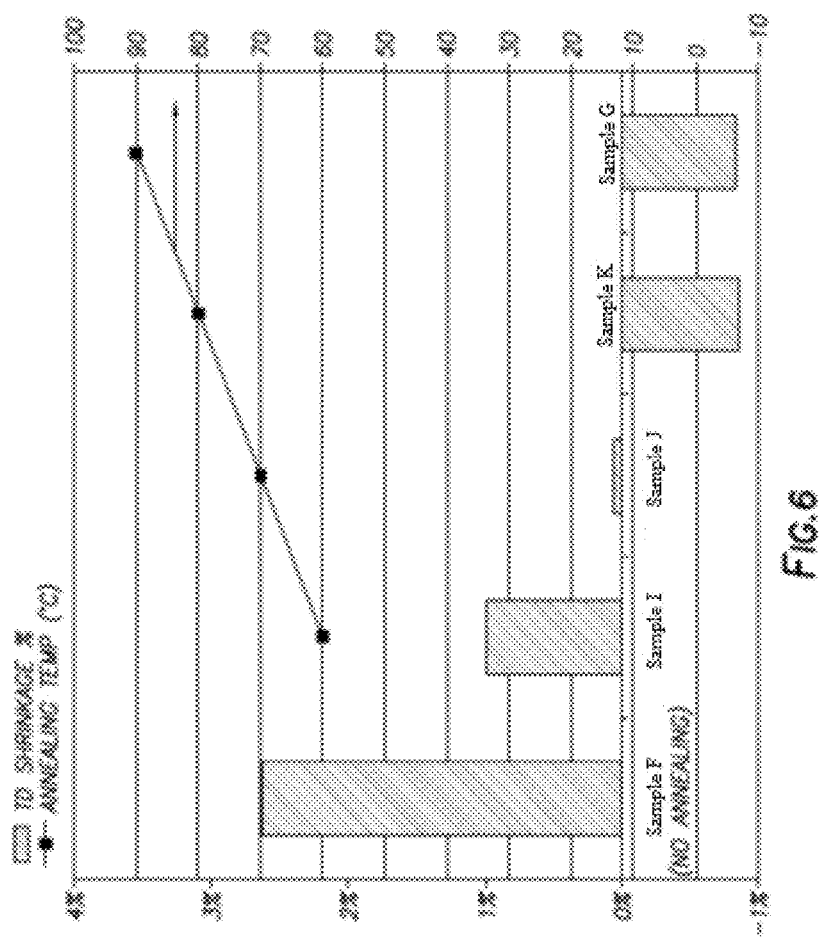
FIG. 6 is a graph showing shrinkage observed on film samples produced at same blown film line conditions, but without using the present thermal treatment systems.

As shown in FIG. 6, for thermal treatment of DVA film consisting of Nylon 6 (Tg 47° C.) and Nylon 6.6 (Tg 70° C.), heating rollers having a temperature between about 50° C. to 80° C. is most effective. As shown in FIG. 6, more than 2% shrinkage was observed on film samples produced at same blown film line conditions, without using the present thermal treatment system. On the other hand, using the thermal treatment system reduced shrinkage below 1 percent and was key for maintaining film dimension stability during the first two (2) days post production.

Subsequently, treated film and untreated film samples were stored in an oven for 1 day at 60° C. and three weeks after the production of this film, the film was found to retain its dimensions when exposed to 60° C. for one day, having less than 1% shrinkage. After three weeks, there was no difference between the treated and un-treated samples. For the un-treated sample, the shrinkage of >2% happens during the first days after production. Once the film dimensions are set, the film retains its dimensions, even when the film is exposed to 60° C. for one day. Table 2 immediately below provides the TD/MD shrinkage during oven test at 60° C. for one day.

TABLE 2

| Sample Description | TD | MD |
|---|---|---|
| Day 1 No Thermal Treatment (Film F) | 0.5% | 0.5% |
| Day 1 90° C. Thermal Treatment (Film G) | 0.6% | 0.5% |
| Day 2 60° C. Thermal Treatment (Film H) | 0.1% | 0.3% |

Figure 7:
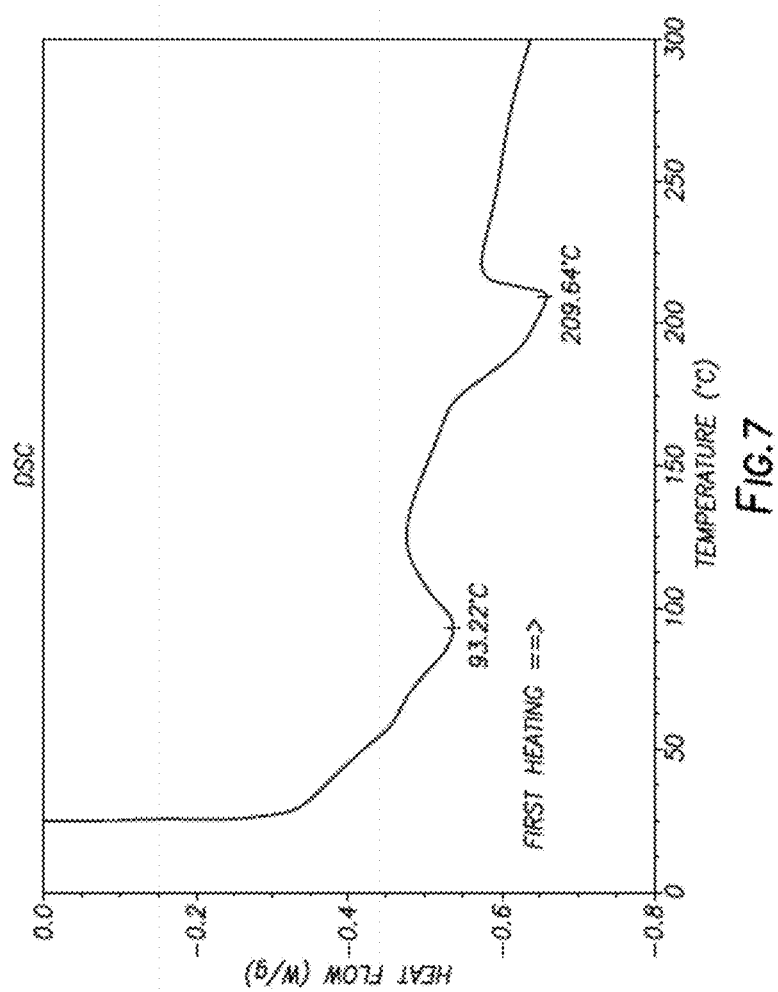
FIG. 7 is a graph showing DSC curves and melting points for various film samples.

As shown in FIG. 7, a first heating of film sample provides a DSC curve that shows a first melting point around 93° C. For operating temperatures above 90° C., two films should be separated to avoid the film adhering together and combined subsequent. Running two different thermal treatment systems is an option to allow running at higher temperatures.

As shown in FIG. 2, one processing factor that will influence the degree of shrinkage is the Blow Up Ratio of the film (BUR=0.637×(lay flat width/die diameter). The higher the BUR, the higher the shrinkage will be in TD direction post production. For example, TD shrinkage of film after running at BUR>2.5 could be higher than 20%, especially for thin film (FIG. 8).

Figure 8:
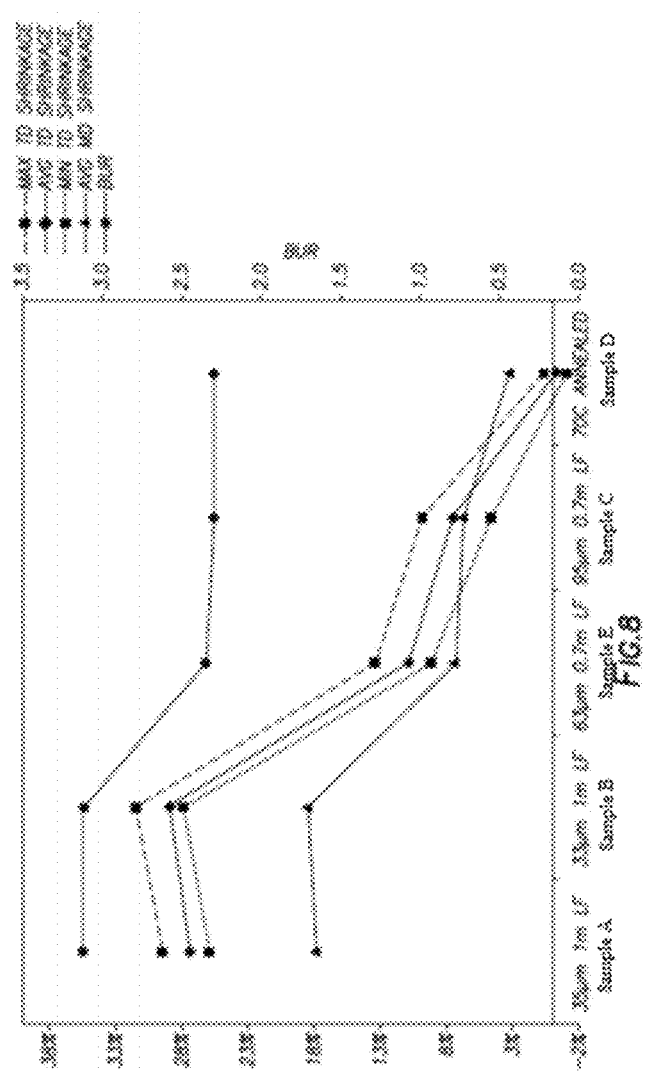
FIG. 8 is a graph showing thickness of film versus shrinkage for thermal treated film and untreated film.

As shown in FIG. 8, on the primary Y-axis, the degree of shrinkage post production, on the secondary Y-axis the BUR and on the X-axis the film thickness (varying from 33 micron to 95 micron). Sample D has same thickness and process conditions as C with the exception that D sample has been through the thermal treatment system. All other samples (A, B, C, and E) have not been thermal treated. By heating at 70° C., the TD shrinkage could be eliminated.

We claim:

1. A method of making a film comprising the steps of:
   (a) providing a dynamically vulcanized thermoplastic elastomeric material melt comprising an elastomer and a thermoplastic resin, wherein the elastomer forms a discontinuous phase of small particles in a continuous phase of thermoplastic resin;
   (b) introducing the dynamically vulcanized thermoplastic elastomeric material melt into a die, the die having a die diameter;
   (c) extruding a continuous tubular film bubble from the die, the tubular film bubble comprising the dynamically vulcanized thermoplastic elastomeric material melt and having a bubble diameter, wherein the bubble diameter is a multiple of a blow-up ratio and the die diameter;
   (d) collapsing the tubular film bubble onto a collapsing frame to produce a film;
   (e) drawing the film onto a plurality of rollers comprising heated rollers and cooling rollers; and
   (f) relaxing the film to a thickness of between about 10 microns to about 300 microns,
wherein (1) the film is stretched by the plurality of rollers in step (e) in the transverse direction but not the machine direction, or (2) the film is stretched by the plurality of rollers in step (e) in the machine direction but not the transverse direction, or (3) the film is stretched in both a transverse direction and a machine direction by the set of heated rollers.

2. The method of claim 1, further comprising the step of melting a plurality of dynamically vulcanized pellets to produce the dynamically vulcanized thermoplastic elastomeric material melt prior to step (a).

3. The method of claim 1, wherein the film has a shrinkage factor of one percent or less.

4. The method of claim 1, wherein the film is a pneumatic tire inner liner.

5. The method of claim 1, wherein the film is a stretch film.

6. The method of claim 1, wherein the film is tubular film, a single sheet film, or a multi-sheet film.

7. The method of claim 1, wherein the die is annular, spider, or spiral die.

8. The method of claim 1, wherein the continuous tubular film bubble is drawn upwards when extruded from the diet in step (c).

9. The method of claim 8, further comprising the step of cooling the continuous tubular film bubble drawn upward.

10. The method of claim 1, further comprising the step of cooling the tubular film bubble after step (c) to a frost line.

11. The method of claim 1, wherein the tubular film bubble is drawn onto the collapsing frame in step (d) with a plurality of nip rollers.

12. The method of claim 1, wherein the plurality of rollers is positioned upstream of winding equipment used to relax the film in step (f).

13. The method of claim 1, wherein the plurality of rollers in step (e) is used off-line.

14. The method of claim 1, further comprising the step of cooling the film as the film is drawn by the plurality of rollers in step (e).

15. The method of claim 1, wherein the temperature of each of the heated rollers is between about 70° C. to 300° C.

16. The method of claim 1, wherein the temperature of each of the cooling rollers is between about 0° C. to 15° C.

17. The method of claim 14, wherein the temperature of the film is reduced to less than about 5° C. while the film stretched in step (e).

18. The method of claim 1, further comprising the step of rolling or cutting the film after step (e).

19. The method of claim 1, wherein the film is collapsed in step (d) between two or more nip rollers.

20. A method of making a film comprising the steps of:
   (a) forming a thermoplastic elastomeric material melt comprising an elastomer and a thermoplastic resin such that the thermoplastic elastomeric material is dynamically vulcanized;
   (b) extruding the thermoplastic elastomeric material melt through a die having a diameter to form a tubular film bubble;
   (c) collapsing the tubular film bubble onto a collapsing frame to produce a thermoplastic elastomeric film; and
   (d) drawing the film onto a plurality of stationery plates to produce a film having a thickness between about 10 microns to about 300 microns and having a shrinkage factor equal to or less than one percent, wherein the plurality of stationery plates comprises a plurality of heated plates and a plurality of cooling plates and the temperature of the heated plates is between about 70° C. to 300° C. and the temperature of the cooling plates is between about 0° C. to 15° C.

21. A thermal treatment system used to produce a film, wherein the system comprises a plurality of heated rollers and a plurality of cooling rollers configured to draw the film, wherein the temperature of each heated roller is between about 70° C. to 300° C., the temperature of each cooling roller is between about 0° C. to 15° C. and the film is drawn from a collapsing frame onto the plurality of heated rollers positioned upstream of a winding process or off-line to produce the film having a thickness of between about 10 microns to 300 microns, and a shrinkage factor of one percent or less, and wherein (1) the plurality of rollers is configured to stretch the film in the transverse direction but not the machine direction, or (2) the plurality of rollers is configured to stretch the film in the machine direction but not the transverse direction, or (3) the heated rollers are configured to stretch the film in both a transverse direction and a machine direction.

22. The system of claim 21, wherein the film comprises a dynamically vulcanized thermoplastic elastomeric material, further comprising an elastomer and a thermoplastic resin, wherein the elastomer forms a discontinuous phase of small particles in a continuous phase of thermoplastic resin.

* * * * *